United States Patent [19]

Sano et al.

[11] 4,200,735

[45] Apr. 29, 1980

[54] CELLULOSIC ION EXCHANGE FIBERS AND METHOD FOR PREPARING SAME

[75] Inventors: Takezo Sano, Takatsuki; Ichiki Murase, Ibaraki, both of Japan

[73] Assignee: Sumitomo Chemical Company, Limited, Osaka, Japan

[21] Appl. No.: 15,217

[22] Filed: Feb. 26, 1979

[30] Foreign Application Priority Data

Mar. 6, 1978 [JP] Japan ............................. 53/25877

[51] Int. Cl.$^2$ .............................................. C08B 15/06
[52] U.S. Cl. ......................................... 536/30; 8/196; 536/32; 536/43
[58] Field of Search .................. 8/196; 536/30, 32, 43

[56] References Cited

U.S. PATENT DOCUMENTS

| 3,379,719 | 4/1968 | Rulison | 8/196 |
| 3,464,781 | 9/1969 | Berni et al. | 536/43 |
| 4,016,340 | 4/1977 | Kolesinski et al. | 536/43 |
| 4,032,293 | 6/1977 | Perrier et al. | 8/196 |
| 4,133,929 | 1/1979 | Bowes et al. | 536/30 |

FOREIGN PATENT DOCUMENTS

479341 2/1938 United Kingdom ....................... 8/196

OTHER PUBLICATIONS

American Dyestuff Reporter, Jun. 7, 1965, pp. 29–35.
Polymer Science USSR 7, (12), pp. 2212–2216 (1965).

Journal fur Praktische Chemie, Band 311, pp. 851–856, (1969).

*Primary Examiner*—Ronald W. Griffin
*Attorney, Agent, or Firm*—Stevens, Davis, Miller & Mosher

[57] ABSTRACT

A cellulosic ion-exchange fiber having a functional group represented by the formula,

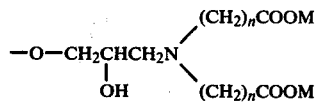

wherein n is 1 or 2 and M is a hydrogen atom, alkali metal or ammonium residue, is produced by dipping a cellulosic fiber in an aqueous solution containing an intermediate of the formula,

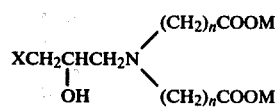

wherein n and M are as defined above; and X is halogen, in the presence of an alkali and applying heat treatment, thereby introducing the above-mentioned functional group.

16 Claims, No Drawings

CELLULOSIC ION EXCHANGE FIBERS AND METHOD FOR PREPARING SAME

The present invention relates to novel cellulosic ion-exchange fibers having a functional group containing an iminodiacetic acid or iminodipropionic acid group chemically linked to the cellulose, a process for the production thereof and filter materials comprising said cellulosic ion-exchange fibers.

It is well known that ion-exchange materials have become to be widely used not only for water purification and water treatment but also for purification of organic substances and as catalysts for various reactions and gas absorbers. As the ion-exchange materials, different types of ion-exchange resins comprising powdery, granular or membraneous organic polymers are generally used in practice. There are many proposals on fibrous ion-exchange fibers for the following reasons: (1) The rate of ion-exchange is high because of the large surface area per unit weight or unit volume; (2) even very large molecules can easily be diffused because of the highly hydrophilic two-dimensional structure; and (3) the fibers can be used in the form of staple filament fabrics, non-woven fabrics or the like. As ion-exchange fibers, cation exchange type or anion exchange type fibers have been developed. These ion-exchange fibers, however, are so poor in selectivity to metallic ions that they can not sufficiently display an ability to collect heavy metals in systems wherein alkali metals or alkaline earth metals coexist in high concentrations. In recent years, there have appeared many problems which should be solved sooner or later, for example, environmental pollution owing to heavy metals including mercury, cadmium and the like; saving in resources such as recovery of expensive metals (e.g. zinc, nickel, copper) from waste water; and the rationalization of production by the removal of small amounts of metals from useful substances. From these standpoints, chelate type ion-exchange materials are expected as a tool helpful to solve these problems.

As chelate type ion-exchange materials of a particle form, for example styrene-based iminodiacetic acid type ones have been developed. But there are no such materials of a fibrous form which are superior in heavy metal collecting ability and strength and are available at a low cost in practical use. For the reasons described above, the inventors thought to develop chelate type ion-exchange fibers having a selective metal collecting ability.

The inventors extensively studied a simple process for producing chelate type ion-exchange fibers with attention paid to cellulose or cellulosic derivatives cheaply available as a base fiber and an iminodiacetic acid group as a chelating functional group. As a result, the inventors succeeded in developing such fibers satisfying these requirements by the method described below. The inventors thus attained the present invention.

An object of the present invention is to provide novel chelate type cellulosic ion-exchange fibers which are derived from a cheap cellulose and are superior in heavy metal collecting ability, a simple and economical process for producing them and filter materials containing them.

The present invention provides novel cellulosic ion-exchange fibers having a functional group represented by the formula:

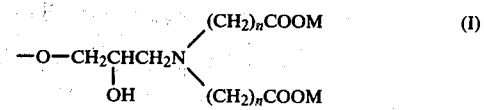

wherein n is an integer of 1 or 2 and M is a hydrogen atom, alkali metal or ammonium residue; and a method for producing cellulosic ion-exchange fibers comprising dipping cellulosic fibers in an aqueous solution containing an intermediate of the formula:

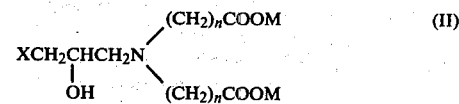

wherein n and M are as defined above; and X is a chlorine, bromine or iodine atom, in the presence of an alkali and applying heat treatment thereby introducing the functional group represented by the formula (I) described above onto the cellulosic fibers; and provides filter materials containing the above-mentioned fibers alone or as one component.

Next, specific explanation will be given of the production of the iminodiacetic acid type cellulosic ion-exchange fibers of the present invention.

Preferably, the process of the present invention comprises two steps. In the first step, the intermediate of the formula (II) is produced by reacting an epihalohydrin with iminodiacetic acid, iminodipropionic acid or a salt thereof in water; and the intermediate in water is then treated at a low temperature with addition of an alkali to prepare a "Solution A". In the second step, cellulosic fibers are impregnated with the "Solution A" and heat treated to react the cellulosic fibers with the intermediate thereby producing the objective cellulosic ion-exchange fibers having a functional group of the formula (I) containing iminodiacetic acid, iminodipropionic acid or a salt thereof, chemically linked to the cellulose. As the cellulose used in the present invention, there may be given as examples wood pulp, cotton, flax, hemp, rayon, acetate and the like. These celluloses may be blended with some other synthetic fibers if necessary, and may be used in any form of yarns, fabrics and non-woven fabrics.

In the synthesis of the "Solution A", the epihalohydrin used includes epichlorohydrin, epibromohydrin and epiiodohydrin, and epichlorohydrin is preferred from the economical point of view, and iminodiacetic acid or iminodipropionic acid may be used in any form of free acid, metallic salt and ammonium salt, but metallic salts particularly alkali metal salts such as sodium salt and potassium salt are preferred because they can react uniformly in water. In the alkali treatment, the temperature is preferably 0° to 15° C., more preferably 0° to 10° C. The alkali used herein refers to sodium hydroxide, potassium hydroxide, lithium hydroxide and the like. The effect of the alkali is to act on the epoxidation of the intermediate and the reaction between the intermediate and cellulose in the second step, thereby accelerating the rate of reaction and increasing the conversion. A preferred amount of the alkali is more than the stoichiometric amount necessary for the epoxidation and at the same time more than an amount equivalent to one glucose unit of the cellulose used in the second step. The amount of alkali used is preferably 10 to 50 parts by weight, more preferably 15 to 45 parts by weight per 100 parts by weight of water. Too large amounts of the alkali make the reaction system heterogeneous and the reaction difficult, which means economical disadvantages. The molar ratio of intermediate (II) to cellulose (as $C_6H_{10}O_5$) of the reaction is preferably 0.1/1 to 10/1, more preferably 0.3/1 to 7/1. The form of the cellulosic fibers used in the second step is not particularly limited, if it is such that the fibers are easily impregnated with the previously prepared "Solution A". In dipping the cellulosic fibers, uniform impregnation is essential. The dipping is carried out in the same temperature range with the alkali treatment described above.

In the reaction of heat treatment, the temperature is preferably 20° to 200° C., more preferably 50° to 150° C. After the reaction, the fibers are neutralized and washed with water. Preferably, the cellulosic ion-exchange fibers thus obtained have an ion-exchange capacity of 0.1 to 1.3 meq/g (converted to the basis of sodium ion exchange capacity).

The process of the present invention has the following characteristics:

(1) In introducing an iminodiacetic acid or iminodipropionic acid group onto cellulose, the reaction between the intermediate of the formula (II) and cellulose is novel.

(2) The process of the present invention can be carried out very efficiently by separating the process into two steps (preparation of the "Solution A" and reaction with cellulose), because side reactions, for excample crosslinking reaction between epihalohydrin and cellulose, can be minimized and because an optional amount of cellulose can be used for the reaction by preparing the "Solution A" previously.

(3) The reaction between the "Solution A" and cellulose can be achieved satisfactorily by merely using the "Solution A" in an amount enough for the uniform impregnation of the cellulose and applying heat treatment, and there is no necessity of using the reagent and solvent in excess enough to stir the system comprising them. Consequently, the reactors can be made extremely compact. Further, amounts of reagents necessary for the reaction are small so that amounts of reagents necessary for final neutralization and washing are also small. Consequently, the effect of decreasing waste water treatment cost is extremely large. Also, the reaction can be carried out in a slurry state with stirring by using large excess of "Solution A", although the reaction is still heterogeneous.

The cellulosic ion-exchange fibers thus obtained have the following characteristics: The color is white; they have an ability to selectively collect heavy metal ions (e.g. mercury, copper, aluminum, iron, nickel, lead, chromium, cadmium, silver) even in the presence of alkali metal ions or alkaline earth metal ions (e.g. calcium) of high concentrations; and they can be used repeatedly by regeneration with an acid because the functional group is linked chemically to cellulose.

By making use of the aforesaid advantages including the selective metal collecting ability, the cellulosic ion-exchange fibers of the present invention are useful as filter materials in a wide range of applications, for example not only for desalting or softening of water but also for separation or recovery of different metallic ions. Particularly when the cellulose is a pulp fiber, it easily takes the shape of filter paper so that it is desirable as a developing agent for heavy metal analysis and an ion-adsorbing filter paper. When the cellulose is formed into filter paper, it may be used alone or may be blended with other fibrous materials such as well known natural or synthetic pulps (e.g. cellulosic pulp, polyethylene pulp, polypropylene pulp) according to the purposes.

The present invention will be illustrated specifically with reference to the following examples.

EXAMPLE 1

(1) Reaction between epichlorohydrin and iminodiacetic acid (synthesis of the "Solution A")

In a 3-liter separable flask, 240 g (6 moles) of sodium hydroxide were dissolved in 1500 ml of distilled water and 399 g (3 moles) of iminodiacetic acid were added thereto with stirring. After further adding 278 g (3 moles) of epichlorohydrin thereto, a reaction was carried out at 60° C. for 4 hours. After the reaction was finished, the reaction solution was allowed to cool and then further cooled to 0° C. with ice, and 480 g (12 moles) of sodium hydroxide were slowly added thereto.

(2) Reaction with cellulose

Six hundred grams of cotton linter pulp was placed in a 5-liter separable flask and impregnated with the above "Solution A" as uniformly as possible. The contents in the flask were heated for 8 hours in an oil bath of 110° C. to react, while allowing them to keep still. After the reaction, the contents were washed with water, 1 N-hydrochloric acid and then distilled water and dried to obtain a white cellulosic ion-exchange fiber. Yield was 556 g. The ion-exchange capacity of the fiber was measured batchwise by the usual method, and the capacity per 1 g dry cellulosic ion-exchange fiber was as follows: 17.6 mg for Na; 13.9 mg for Cu(II); 43.0 mg for Pb(II); and 12.7 mg for Zn(II).

EXAMPLE 2

(1) Reaction between epichlorohydrin and iminodipropionic acid (synthesis of the "Solution A")

In a 3-liter separable flask, 240 g (6 moles) of sodium hydroxide were dissolved in 1500 ml of distilled water, 483 g (3 moles) of iminodipropionic acid were added thereto with stirring and further 278 g (3 moles) of epichlorohydrin were added. After the addition, a reaction was carried out at 80° C. for 5 hours. After the reaction, the reaction solution was allowed to cool and then further cooled to 0° C. with ice, and 600 g (15 moles) of sodium hydroxide were slowly added thereto.

(2) Reaction with cellulose

Six hundred grams of cotton linter pulp were placed in a 5-liter separable flask and impregnated with the above "Solution A" as uniformly as possible. The contents in the flask were heat treated for 8 hours in an oil bath of 130° C. while allowing them to keep still. After the reaction was finished, the contents were washed with water, 1 N-hydrochloric acid and then distilled water and dried to obtain a white cellulosic ion-exchange fiber. Yield was 583 g. The ion-exchange capacity of the fiber was measured batchwise by the usual method, and the capacity per 1 g dry cellulosic ion-exchange fiber was as follows: 16.0 mg for Na; 12.0 mg for Cu(II); 40.0 mg for Pb(II); and 5.1 mg for Al(III).

EXAMPLE 3

9.5 g of the ion-exchange fiber as used in Example 1 and 0.5 g of polyethylene pulp were mixed in 30 liters of water with stirring, and formed into paper by an ordinary paper-making machine (sheet size; 25 cm×25 cm). The paper was then treated at 150° C. on a hot roll to obtain a filter paper of 0.28 mm in thickness. The filter paper showed a rate of filtration of 1.2 ml/cm²/min under a 100 cm head of water.

This filter paper (diameter 47 mm) was set on a glass filter, and 500 ml of distilled water containing each 100 μg of Fe⁺⁺, Cd⁺⁺, Pb⁺⁺, Zn⁺⁺ and Cu⁺⁺ ions and 400 mg of Ca⁺⁺ ion were passed therethrough. On measuring the concentrations of these metallic ions in the filtrate, it was found that none of Fe⁺⁺, Cd⁺⁺, Pb⁺⁺, Zn⁺⁺ and Cu⁺⁺ ions were detected by atomic absorption analysis. Further it was confirmed by fluorescent X-ray analysis that the above heavy metal ions were completely adsorbed onto the filter paper.

What is claimed is:

1. A cellulosic ion-exchange fiber having a functional group represented by the formula,

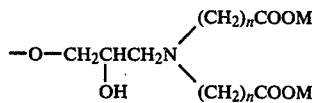

wherein n is 1 or 2 and M is a hydrogen atom, alkali metal or ammonium residue.

2. A cellulosic ion-exchange fiber according to claim 1, wherein said cellulosic ion-exchange fiber has an ion-exchange capacity of 0.1 to 1.3 meq/g (converted to the basis of sodium ion-exchange capacity).

3. A method for producing a cellulosic ion-exchange fiber which comprises dipping a cellulosic fiber in an aqueous solution containing an intermediate of the formula,

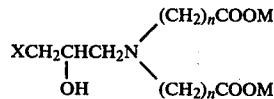

wherein n is 1 or 2, M is a hydrogen atom, alkali metal or ammonium residue and X is a chlorine, bromine or iodine atom, in the presence of an alkali and applying heat treatment, thereby introducing a functional group represented by the formula,

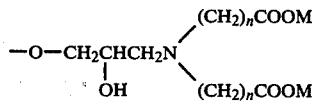

wherein n and M are as defined above, onto the cellulosic fiber.

4. A method according to claim 3, wherein said intermediate is produced by reacting an epihalohydrin with iminodiacetic acid, iminodipropionic acid or an alkali metal or ammonium salt thereof.

5. A method according to claim 4, wherein the epihalohydrin is epichlorohydrin.

6. A method according to claim 3, wherein the dipping is carried out at a temperature of 0° to 15° C.

7. A method according to claim 6, wherein the dipping temperature is 0° to 10° C.

8. A method according to claim 3, wherein the amount of alkali is 10 to 50 parts by weight per 100 parts by weight of water.

9. A method according to claim 8, wherein the amount of alkali is 15 to 45 parts by weight per 100 parts by weight of water.

10. A method according to claim 3, wherein the molar ratio of the intermediate to cellulose (as $C_6H_{10}O_5$) is 0.1/1 to 10/1.

11. A method according to claim 10, wherein the molar ratio of the intermediate to cellulose (as $C_6H_{10}O_5$) is 0.3/1 to 7/1.

12. A method according to claim 3, wherein the heat treatment is carried out at a temperature of 20° to 200° C.

13. A method according to claim 12, wherein the heat treatment temperature is 50° to 150° C.

14. A method according to claim 3, wherein the cellulosic ion exchange fiber has an ion-exchange capacity of 0.1 to 1.3 meq/g (converted to the basis of sodium ion-exchange capacity).

15. A filter material comprising a cellulosic ion-exchange fiber alone or as one component, having a functional group represented by the formula,

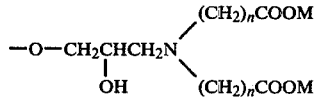

wherein n is 1 or 2 and M is a hydrogen atom, alkali metal or ammonium residue.

16. A filter material according to claim 15, wherein said cellulosic ion-exchange fiber has an ion-exchange capacity of 0.1 to 1.3 meq/g (converted to the basis of sodium ion-exchange capacity).

* * * * *